United States Patent
Wolfsberger

(10) Patent No.: US 10,265,937 B2
(45) Date of Patent: Apr. 23, 2019

(54) METHOD AND APPARATUS FOR MANUFACTURING A SANDWICH COMPONENT

(71) Applicant: MAGNA STEYR Fahrzeugtechnik AG & Co KG, Graz (AT)

(72) Inventor: Guenter Wolfsberger, Lieboch (AT)

(73) Assignee: MAGNA STEYR Fahrzeugtechnik AG & Co KG, Graz (AT)

(*) Notice: Subject to any disclaimer, the term of this patent is extended or adjusted under 35 U.S.C. 154(b) by 0 days.

(21) Appl. No.: 15/317,490

(22) PCT Filed: Dec. 21, 2015

(86) PCT No.: PCT/EP2015/080778
§ 371 (c)(1),
(2) Date: Jul. 3, 2017

(87) PCT Pub. No.: WO2016/102454
PCT Pub. Date: Jun. 30, 2016

(65) Prior Publication Data
US 2017/0361569 A1    Dec. 21, 2017

(30) Foreign Application Priority Data
Dec. 22, 2014   (EP) .................................... 14199862

(51) Int. Cl.
*B32B 37/00* (2006.01)
*B32B 37/18* (2006.01)
(Continued)

(52) U.S. Cl.
CPC .............. *B32B 37/18* (2013.01); *B29C 70/68* (2013.01); *B32B 3/12* (2013.01); *B32B 5/00* (2013.01);
(Continued)

(58) Field of Classification Search
CPC ............ B32B 37/0076; B32B 37/0084; B32B 37/1284; B32B 37/1292; B32B 37/146;
(Continued)

(56) References Cited

U.S. PATENT DOCUMENTS

| 5,096,526 A | 3/1992 | Engwall |
| 6,114,050 A | 9/2000 | Westre et al. |

(Continued)

FOREIGN PATENT DOCUMENTS

| CN | 103201096 A | 7/2013 | |
| DE | 10153973 A1 | 5/2003 | |
| DE | 102013013419 A1 | 3/2014 | |
| EP | 0420750 A1 * | 4/1991 | ............ E04C 2/284 |
| JP | 3137942 B2 | 2/2001 | |
| JP | 2013220648 A | 10/2013 | |
| RU | 2316817 C2 | 2/2008 | |

OTHER PUBLICATIONS

Machine translation of EP 0420750.*

(Continued)

*Primary Examiner* — John L Goff, II
(74) *Attorney, Agent, or Firm* — Jordan IP Law, LLC; Todd A. Vaughn

(57) ABSTRACT

A method for manufacturing a sandwich component includes applying at least one matrix material to the upper side and/or the underside of at least one material blank, and arranging the material blanks above one another and/or next to one another. At least two of the material blanks differ in design or matrix material may be applied in different ways along the upper side and/or underside thereof, or matrix material is applied in different ways to at least one of the material blanks along the upper side and/or underside thereof. In that way, at least one horizontal and/or vertical zone of the sandwich component is created having different mechanical properties than other regions of the sandwich component. The material blanks are then pressed to form the sandwich component.

17 Claims, 2 Drawing Sheets

(51) Int. Cl.
  *B32B 37/12* (2006.01)
  *B32B 3/12* (2006.01)
  *B32B 5/00* (2006.01)
  *B32B 7/12* (2006.01)
  *B32B 37/10* (2006.01)
  *B32B 37/14* (2006.01)
  *B32B 37/22* (2006.01)
  *B32B 38/00* (2006.01)
  *B32B 38/18* (2006.01)
  *B29C 70/68* (2006.01)
  *B32B 38/08* (2006.01)

(52) U.S. Cl.
  CPC ............ *B32B 7/12* (2013.01); *B32B 37/0053* (2013.01); *B32B 37/10* (2013.01); *B32B 37/1284* (2013.01); *B32B 37/146* (2013.01); *B32B 37/22* (2013.01); *B32B 38/0004* (2013.01); *B32B 38/08* (2013.01); *B32B 38/18* (2013.01); *B29C 70/681* (2013.01); *B32B 2038/0076* (2013.01); *B32B 2250/40* (2013.01); *B32B 2305/024* (2013.01); *B32B 2605/00* (2013.01)

(58) Field of Classification Search
  CPC ..... B32B 37/18; B32B 37/182; B32B 37/185; B29C 66/725; B29C 66/72525; B29C 66/7254; B29C 70/68
  See application file for complete search history.

(56) References Cited

U.S. PATENT DOCUMENTS

| | | | |
|---|---|---|---|
| 2005/0126676 A1* | 6/2005 | Karlsson | B32B 37/24 156/39 |
| 2007/0062639 A1* | 3/2007 | Chang | B32B 37/1292 156/291 |
| 2008/0274326 A1* | 11/2008 | Kim | B29C 70/24 428/90 |
| 2009/0020216 A1* | 1/2009 | Ruokolainen | B32B 7/14 156/184 |
| 2011/0064908 A1* | 3/2011 | Kweder | B29B 11/16 428/113 |
| 2011/0076117 A1* | 3/2011 | Iizuka | H01L 21/6719 414/217 |

OTHER PUBLICATIONS

Notification of Reasons for Refusal for Japanese Patent Application No. 2016-575653, dated Feb. 1, 2018, 11 pages including 5 pages of English translation.

Notice of Preliminary Rejection for Korean Patent Application No. 10-2016-7033977, dated Mar. 5, 2018, 10 pages including 4 pages of English translation.

* cited by examiner

METHOD AND APPARATUS FOR MANUFACTURING A SANDWICH COMPONENT

CROSS-REFERENCE TO RELATED APPLICATIONS

The present application is a National Stage Application of PCT International Application No. PCT/EP2015/080778 (filed on Dec. 21, 2015), under 35 U.S.C. § 371, which claims priority to European Patent Application No. EP 14199862.5 (filed on Dec. 22, 2014), which are each hereby incorporated by reference in their respective entireties.

TECHNICAL FIELD

The present invention relates to a method for manufacturing a sandwich component and to an apparatus for carrying out this very method.

BACKGROUND

A sandwich component should be generally understood as meaning a component that is made up of layers of the same material or different materials. In the simplest case, sandwich components consist of two cover layers, an upper cover layer and a lower cover layer, as well as a core layer, which is arranged between the upper cover layer and the lower cover layer. A connection between the individual layers usually takes place by pressing by means of a suitable tool, such as, for example, a press.

Such sandwich components are used in many different areas. In recent years, however, their importance particularly as a structural component in the area of lightweight automobile construction has increased enormously. A "structural component" is understood here as meaning components of three-dimensional design which do not necessarily have to be load-bearing components of the vehicle. For example, the structural component may also be engine hoods, tailgates or doors.

The prior art discloses many different approaches to the manufacturing of structural components.

For example, a method for manufacturing a sandwich component for use as a structural component of a vehicle is described in DE 10 2012 222 376 A1. This involves first arranging an inner cover layer in a tool, arranging a core layer that is porous at least in certain portions on the inner cover layer and in turn arranging an outer cover layer on said core layer. After the described arrangement of the individual layers, a process pressure is produced against the two cover layers and a core pressure is produced in the core layer to equalize the pressure with respect to the process pressure. In this way, the core layer is not subjected to excessive process pressure and does not have to be over-dimensioned in terms of its stability.

DE 10 2013 013 419 A1 discloses a continuous production method for manufacturing sandwich components that vary on the visible side, an apparatus for manufacturing the sandwich component and a sandwich component that can be manufactured thereby. Starting with a cover layer/core layer/cover layer stack, wherein the cover layers consist of layers of fibrous thermoplastic material, the method presented in this document for manufacturing the sandwich component comprises a first step of heating the sandwich arrangement, wherein the sandwich arrangement is heated until the thermoplastic material of the layer of fibrous material at least begins to flow. The heating takes place in a heating tool, for example a heating press. When the heating press is used, the pressing pressure produced has the effect that the layers of fibrous thermoplastic material adhere to the honeycomb core (core layer). In the next method step, a decorative layer with a foam layer is arranged on the heated sandwich arrangement in such a way that the foam layer faces the cover layer. The viscous thermoplastic of the cover layer brings about adhesive bonding of the foam layer to the sandwich arrangement. After that, the surface of the decorative layer is adapted by means of a form template to the surface structure that the finished sandwich arrangement should have. For this purpose, one or more form template(s) is/are arranged on one or both basic mold surfaces of the compression molding tool. The final step of the method is represented by the cooled compression molding by means of a molding press.

Similarly, EP 1 897 680 A1 describes a method for manufacturing a fiber-reinforced sandwich component with a honeycomb core, wherein the honeycomb core is only closed on one side by means of a cover layer, but the honeycombs of the honeycomb layer are closed on both sides. The method here comprises the steps of: —manufacturing a lay-up comprising the honeycomb core, as well as, at least on one side of the honeycomb core, arranged from the inside to the outside, a curable adhesive layer, a barrier layer and a fiber layer; —confining the lay-up in a gas-tight space; —producing a vacuum in this gas-tight space; —completely or partially curing the adhesive layer between the honeycomb core and the barrier layer under this vacuum such that the honeycomb cells are at least partly evacuated before they are closed by the barrier layer; —after completely or partially curing the adhesive layer, infusing the fiber layer under vacuum with a matrix material, and curing the matrix material under vacuum.

SUMMARY

A problem that is addressed by the invention is that of proposing an alternative method for manufacturing a sandwich component and an apparatus for carrying out this very process, wherein the intention is for the properties of the sandwich component to be optimized for different intended uses.

This problem is solved by a method for manufacturing a sandwich component with the features as claimed in patent claim 1, as well as the features of an apparatus represented in patent claim 17 for carrying out this very method. Advantageous refinements of the invention can be taken from the dependent patent claims.

The method according to the invention for manufacturing a sandwich component includes the following steps: providing a plurality of material blanks; applying at least one matrix material to the upper side and/or the underside of at least one material blank; arranging the material blanks above one another and/or next to one another, wherein at least two material blanks are arranged one above another, wherein at least two of the material blanks differ in design or matrix material is applied in different ways along the upper side and/or underside thereof; or matrix material is applied in different ways to at least one of the material blanks along the upper side and/or underside thereof, and therefore at least one horizontal and/or vertical zone of the sandwich component is created having different mechanical properties than other regions of the sandwich component; and pressing the material blanks to form the sandwich component.

At least prior to the pressing, the material blanks are substantially flat components with a defined border.

According to the invention, a "horizontal zone" extends here in the longitudinal direction over a region of the sandwich component, i.e. normally to the layer construction thereof of material blanks. A "vertical zone" extends in the direction of the layer construction of the sandwich component, i.e. normally to the extent thereof in the longitudinal direction.

The phrase "in different ways" should be understood as meaning applying matrix material by applying a different amount and/or a different type of matrix material to the material blanks.

It is thereby possible to form one or more special zones, for example in order to avoid injuries in the event of pedestrian collisions and the like, wherein the special zones each differ from other zones or regions of the component.

The at least two material blanks can differ in design in that the two material blanks have a surface area which differs from each other.

A "different surface area" of the material blanks should be understood as meaning a different two-dimensional geometrical shape and/or size of the material blanks, or with unevenness in a two-dimensional projection of the material blanks.

By means of the use of material blanks of different surface area and/or the application of matrix in different ways, zones are created having different properties, in particular of strength and rigidity, since differently shaped material blanks are present in some regions of the component and are absent in other regions, and/or, by means of the different application of matrix in different zones of the component, said individual zones of the component each obtain different properties, for example easier deformability.

Preferably at least one of the material blanks, particularly preferably at least two of the material blanks, comprise(s) fibrous material.

The sandwich component manufactured by the method according to the invention is substantially made up of a number of layers, at least of two layers, of material blanks. A core layer which is preferably provided is preferably arranged here between at least two of the material blanks.

The material blanks are preferably produced from fibrous material and are preferably made thin in comparison with the layer designed as the core layer. The fibers used here are natural fibers, such as, for example, hemp fibers, bamboo fibers, cellulose-based fibers, etc., and/or organic and inorganic man-made fibers, such as, for example, polyamide fibers, glass fibers, carbon fibers, etc.

The fibrous material is consequently preferably made up of fibers that have been processed into woven, nonwoven or knitted fabrics, mats, meshes, etc., wherein these formations have preferably been further processed into a basic matrix suitable for requirements, to form what are known as composite materials.

In an advantageous variant embodiment of the method according to the invention, the material blanks (of fibrous material) are pretreated, wherein all manners of pretreatment that are familiar to a person skilled in the art, such as, for example, priming, impregnating, coating, etc., come into consideration.

The individual material blanks used may differ from one another in their (basic) composition and design.

Advantageously, the material blanks are formed so as to be permeable to the matrix material.

The application of at least one matrix material to the upper side and/or underside of at least one material blank can take place in such a manner that matrix material is applied in different ways to at least two of the material blanks.

According to the method according to the invention, the matrix material is consequently advantageously applied homogeneously and/or inhomogeneously to one or more webs of material.

In a variant embodiment, the individual material blanks are formed in the manner of layers, that is to say they are made up of at least two individual layers, wherein at least one of the individual layers is a fibrous material.

Individual layers of nonfibrous material in this case advantageously consist of plastic and are formed in the manner of films.

At least two of the material blanks can have a different surface area exclusively before completion of the sandwich component since at least one material blank can be cut during the manufacturing process to the same surface area as a further material blank. According to the invention, material blanks may, of course, also have a different surface area after completion. Preferably, at least one material blank, particularly preferably most or all of the material blanks, has/have the shape of the desired sandwich component even before the matrix material is applied.

The matrix material is preferably composed of a thermoplastic and/or thermosetting polymer.

The matrix material is preferably a resin, particularly preferably a synthetic resin (for example polyurethane).

Particularly preferably, the matrix material is formed in an adhesive manner and has, for example, the main components resin and catalyst, or base and catalyst.

In order to influence the properties of the matrix material with respect to diverse requirements, such as, for example, strength or elasticity, additional components and/or materials, such as, for example, fibers, are advantageously admixed with the matrix material.

This may involve short and/or long fibers being admixed homogeneously or inhomogeneously with the matrix material, in order thereby to apply matrix material to the material blanks in different ways, i.e. homogeneously and/or inhomogeneously. Different component properties, such as, for example, an inhomogeneous and/or homogeneous zone stiffness over the surface area of the material blanks, are thus likewise produced. In particular, by different admixing of fibers, at least one zone having different mechanical properties than other regions of the component can also be formed. This results in a sandwich component with a homogeneous and/or inhomogeneous layer structure both over the surface area of the component and over the layer structure of the layers.

The material blanks are preferably mounted in a fan-type gripper (may also be called "hinged gripper") and after matrix material is applied on one side and/or two sides, preferably by means of spraying, are brought together with the core, preferably likewise arranged on a fan of the gripper, or else a plurality of cores (positioned vertically one above another) and therefore the layer construction of the sandwich component is produced.

The material blanks can be present in the individual layers in a different shape, either in a size which permits complete covering of the component to be manufactured or else permits only a partial covering of the surface area of the component to be manufactured, in order thereby to manufacture a different layer construction, or a component which is provided with different functional or component properties in different zones. For this purpose, it is likewise of advantage if the type and/or composition of the fibers in at least two layers, i.e. material blanks, differ from one another.

In addition, it is of advantage if the (predominant) fiber directions or the fiber profile or the fiber orientation of the fibers contained in the material blanks of at least two layers differ from one another, preferably point in a different direction in each case in at least two individual layers, for example are rotated at an angle of greater than 0 and less than 180 degrees with respect to one another, or else are rotated about 180 degrees.

The material blanks or the individual layers that are ready-made in accordance with the contour of the sandwich component can be correspondingly rotated here in front of the further blank or before being brought into the different surface area, or the material blanks, of which at least two have a different surface area, and/or of which the fiber direction(s), the fiber profile and the fiber orientation of at least two layers differ, are preferably arranged on one fan each of the fan-type gripper.

During the period of time in which the material blanks are mounted in the fans of the fan-type gripper, the steps of applying at least one matrix material to the upper side and/or the underside of at least one of the material blanks, wherein matrix material can be applied in different ways to at least two of the material blanks and matrix material can be applied in different ways to at least one of the material blanks along the surface area thereof, wherein the material blanks can comprise a core layer, and pressing the material blanks and the core layer which is preferably present in a press proceed in substantially this very sequence.

During the pressing of the component, the core is preferably also pressed locally or over the entire surface area in such a manner that this serves for producing the component geometry.

Consequently, at the beginning of the method, there is an application of at least one matrix material to the upper side and/or the underside of at least one of the material blanks.

According to the invention, the application of the matrix material preferably takes place on the upper side or the underside of the material blanks, but according to requirements may also take place on the upper side and the underside of the material blanks simultaneously. The latter brings about a time saving in the case of a structure comprising a number of material blanks.

The application of the matrix material to the individual material blanks in this case preferably takes place by means of spraying application and/or a dipping process and/or rolling application (application by means of rollers).

The application unit is particularly preferably a spraying unit, wherein the spraying unit preferably has at least two spray heads, whereby matrix material of various properties, such as, for example, viscosity, thixotropy, composition etc., can be applied to the material blanks in a simple manner. This allows sandwich components with partially different properties, with respect for example to zone stiffness or surface quality, to be produced.

Furthermore, because of the individual application (in various ways) of the matrix material to the individual material blanks, as well as the adaptation of the properties of the matrix material (for example viscosity, thixotropy, amount) to the respective material of the material blanks, only a comparatively thin matrix application is required in each case, resulting in an optimization in terms of weight and function.

In a particularly preferred embodiment of the method according to the invention, at least one material blank designed as a core layer is arranged between two other material blanks. In the finished component, this core layer for example brings about an advantageous stiffening of this very sandwich component.

The core layer is advantageously configured in the manner of a honeycomb. Other structuring and forms of the core layer, such as, for example, a wave-like form, are not weighed out, however.

The core layer is preferably formed from a lightweight material, such as, for example, a polymer (foam, plastic, rubber, etc.), a cellulose-based material (paper, wood, card, etc.), a composite material or else a metal.

In a further optional configuration, the core layer is formed in a layer-like manner, for example, by a number of individual core layers arranged one above another. Here, the at least two individual core layers may be formed differently from one another. In particular, honeycomb cores with a differing honeycomb shape, honeycomb size, honeycomb alignment, differing cell wall geometries and/or material of the honeycomb and/or individual core layers may be stacked and connected to one another. This is especially advantageous because, as a result, the subsequent finished component can be partially provided with different functional properties or component properties, on the one hand the component is intended to have a specific required strength and stiffness, but on the other hand it is intended to comprise soft, easily deformable zones at certain locations, as is advantageous, for example, in the vehicle sector for avoiding injuries in the event of collisions with pedestrians.

The core layer is preferably formed so as to be permeable to the matrix material, or at least semi-permeable.

In the method according to the invention, the material blanks are pressed to form the sandwich component. The pressing takes place by means of a press, preferably by the wet-pressing process.

The apparatus according to the invention for carrying out the previously described method for manufacturing a sandwich component substantially comprises a multi-layer holding unit, wherein a plurality of material blanks can be held vertically one above another in the multi-layer holding unit, and at least one application unit for applying at least one matrix material to the upper side and/or underside of at least one of the material blanks, and at least one press for pressing the material blanks to form the sandwich component.

The multi-layer holding unit can preferably be a fan-type gripper, wherein, in the fan-type gripper, a plurality of material blanks can be held vertically one above another and moved apart horizontally, i.e. can be deployed in the manner of a fan, and therefore the deployed material blanks are readily accessible for the application of a matrix. For the feeding of the material blanks to the press, the material blanks can be dropped into the press by the multi-layer holding unit, in particular fan-type gripper, or else they are pressed by the press while being held in the multi-layer holding unit, in particular fan-type gripper.

The multi-layer holding unit, in particular fan-type gripper, preferably comprises a handling robot or is guided by way of a linear handling system.

The press for pressing the material blanks can also have a cutting apparatus in the region of an upper pressing plate and/or in the region of a lower pressing plate. The arrangement of the cutting apparatus in the region of the upper pressing plate and/or the lower pressing plate achieves the effect of simultaneous pressing of the material blanks (including the core layer) to form a sandwich component and a further, in particular final, trimming of the material blanks. Two working steps are thus combined in one operation.

The press or the pressing tool may also be of a heatable configuration.

By means of the at least one application unit, at least one matrix material is applied to the upper side and/or the lower side of at least one of the material blanks.

The application unit is in this case preferably a spraying unit and/or a dipping unit and/or a rolling unit.

Particularly preferably, the application unit is a spraying unit with at least one second spray head, wherein the second spray head preferably applies matrix material in different ways by applying a different amount and/or a different type of matrix material.

Application by means of spraying application using a spraying unit is particularly advantageous if additional fibrous material, such as, for example, short-fiber material, is admixed with the matrix material.

DRAWINGS

The invention is described below by way of example with reference to the drawings.

DESCRIPTION

Figure 1:
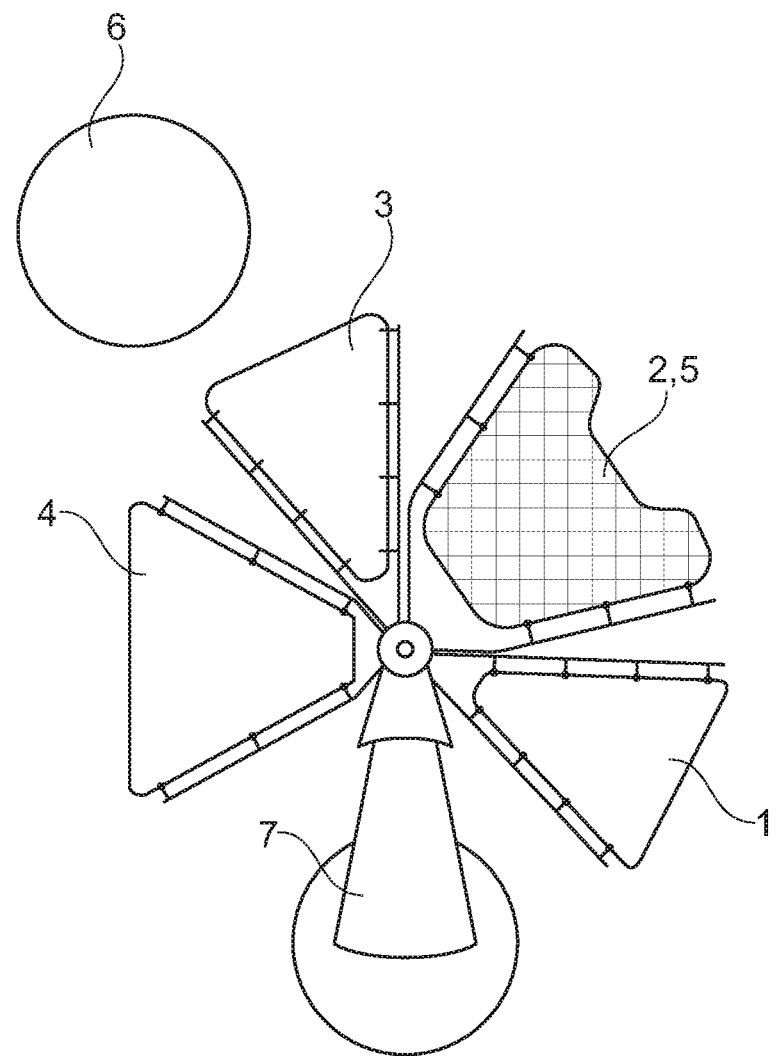
FIG. 1 shows a schematic illustration from above of a fan-type gripper and an application unit of an apparatus according to the invention for carrying out the method according to the invention for manufacturing a sandwich component.

FIG. 1 shows a fan-type gripper 7 which is embodied as a robot and serves as a manipulator for four material blanks 1, 2, 3 and 4 (also called layers). The fan-type gripper 7 brings the layers, i.e. material blanks 1, 2, 3, 4, also comprising the core 5 formed by the material blank 2, into the respective position opposite the spray head of the spraying unit 6 for the spraying application.

After the spraying application, the layers 1, 2, 3, 4 are moved (vertically) one above another by means of the fan-type gripper 7 and inserted into the press. The fastening points or holding points of the respective layers, i.e., material blanks 1, 2, 3, 4, are then opened individually one after another or simultaneously on the fan-type gripper 7 such that layer by layer can be deposited in the heating pressing tool. The press is closed and the sandwich pressed. Pressing can optionally also take place as soon as the layers are moved one above another (positioned vertically one above another) and while the layers are still fastened to the respective fans of the fan-type gripper 7.

Figure 2:
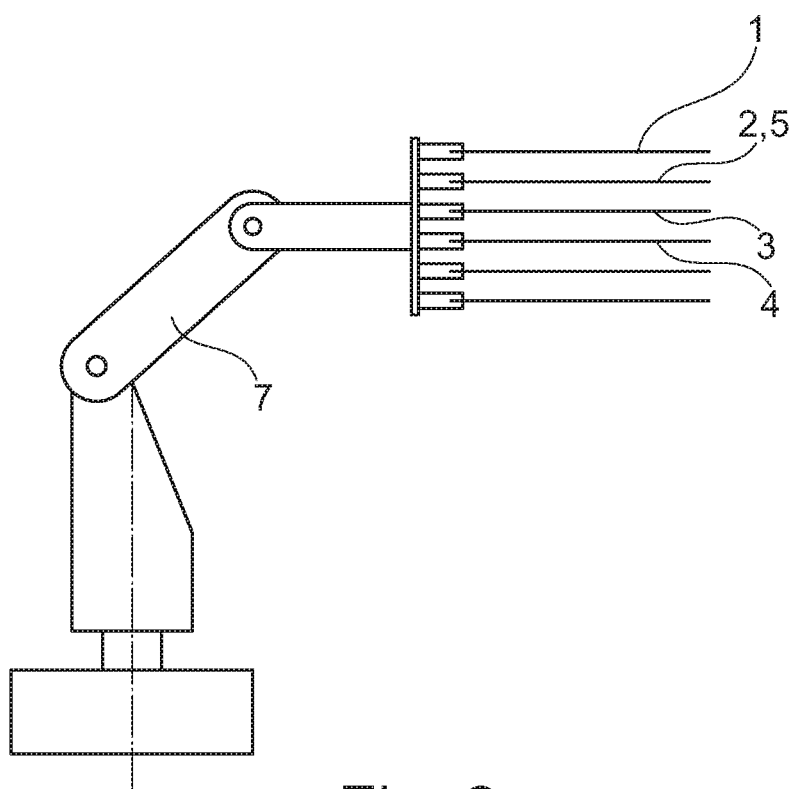
FIG. 2 shows a schematic illustration from the side of a fan-type gripper of an apparatus according to the invention for manufacturing a sandwich component.

FIG. 2 illustrates a side view of a fan-type gripper 7, wherein the individual layers, i.e. material blanks 1, 2, 3, 4 and even further material blanks are held in an arrangement offset vertically and are provided for further processing.

LIST OF REFERENCE SIGNS

First material blank
Second material blank
Third material blank
Fourth material blank
Core layer
Spray head
Fan-type gripper

What is claimed is:

1. A method for manufacturing a sandwich component, comprising:

providing a plurality of material blanks, wherein the providing is performed via a multi-layer holding unit such that the material blanks are horizontally moveable apart from each other;

after the providing, applying at least one matrix material to an upper side and/or an underside of at least one material blank of the material blanks;

arranging, via the multi-layer holding unit, the material blanks vertically above one another, with at least two material blanks of the plurality of material blanks being arranged one above another; and pressing the plurality of material blanks to form the sandwich component such that at least one horizontal zone and/or vertical zone of the sandwich component is created having different mechanical properties than other regions of the sandwich component, wherein at least two different material blanks of the plurality of material blanks differ from each other in design, or during the applying, the at least one matrix material is applied in different ways to the at least one material blank along the upper side and/or the underside of the at least one material blank.

2. The method of claim 1, wherein the at least two different material blanks differ in design with regard to surface area.

3. The method of claim 1, wherein at least two of the plurality of material blanks comprises fibrous material.

4. The method of claim 3, wherein the at least two different material blanks differ in design with regard to a fiber direction of fibers contained therein.

5. The method of claim 1, wherein applying at least one matrix material in different ways comprises applying a different amount and/or a different type of matrix material.

6. The method of claim 1, wherein one of the material blanks is formed by a core layer arranged so as to lie between at least two other material blanks of the plurality of material blanks.

7. The method of claim 1, wherein the at least one horizontal zone of the sandwich component comprises a deformable zone for pedestrian protection.

8. The method of claim 1, wherein at least two of the plurality of material blanks have a different shape before completion of the sandwich component, and at least one material blank is cut to a same shape as a further material blank of the plurality of material blanks.

9. The method of claim 1, wherein at least two of the plurality of material blanks have a different shape after completion of the sandwich component, in order to form the at least one horizontal zone.

10. The method of claim 6, further comprising:

arranging at least two arranged material blanks of the plurality of material blanks at least on one side of the core layer.

11. The method of claim 6, wherein the core layer is formed in the manner of a honeycomb.

12. The method of claim 1, wherein fibers are admixed with the at least one matrix material.

13. The method of claim 1, wherein the applying the at least one matrix material comprises spraying the at least one matrix material, and/or dipping the at least one matrix material, and/or rolling the at least one matrix material.

14. The method of claim 1, wherein pressing the plurality of material blanks is performed via a wet-pressing method.

15. A method of manufacturing a structural component for a vehicle, the method comprising:

holding, via a multi-layer holding unit, at least two material blanks and a core layer, the multi-layer holding unit being configured to vertically position the material blanks and the core layer one above another and also horizontally move the material blanks and the core layer apart from each other;

applying, during the holding, at least one matrix material to an upper side and/or an underside of at least one of the material blanks;

rotating, via the multi-layer holding unit, the material blanks and the core layer such that they are vertically positioned with the core layer arranged between the material blanks; and pressing, after vertically positioning the material blanks and the core layer, the material blanks and the core layer.

16. The method of claim 15, wherein the pressing comprises pressing the material blanks and the core layer while the material blanks and the core layer are held in the vertical position by the multi-layer holding unit.

17. The method of claim 15, further comprising, before the pressing, depositing, via the multi-layer holding unit, the material blanks and the core layer in a pressing tool.

* * * * *